US012781795B2

(12) United States Patent
Hallivuori et al.

(10) Patent No.: US 12,781,795 B2
(45) Date of Patent: Nov. 3, 2026

(54) MONITORING SYSTEM AND A METHOD FOR MONITORING CONDITION OF SAFETY BEARINGS OF A MAGNETICALLY LEVITATED OBJECT

(71) Applicant: SPINDRIVE OY, Lappeenranta (FI)

(72) Inventors: Matti Hallivuori, Lappeenranta (FI); Alexander Smirnov, Lappeenranta (FI)

(73) Assignee: SPINDRIVE OY, Lappeenranta (FI)

( * ) Notice: Subject to any disclaimer, the term of this patent is extended or adjusted under 35 U.S.C. 154(b) by 274 days.

(21) Appl. No.: 18/841,959

(22) PCT Filed: Mar. 7, 2023

(86) PCT No.: PCT/FI2023/050127
§ 371 (c)(1),
(2) Date: Aug. 27, 2024

(87) PCT Pub. No.: WO2023/187252
PCT Pub. Date: Oct. 5, 2023

(65) Prior Publication Data

US 2025/0172174 A1 May 29, 2025

(30) Foreign Application Priority Data

Mar. 28, 2022 (FI) ...................................... 20225264

(51) Int. Cl.
*G01M 13/04* (2019.01)
*F16C 32/04* (2006.01)

(52) U.S. Cl.
CPC ...... *F16C 32/0451* (2013.01); *F16C 32/0442* (2013.01); *G01M 13/04* (2013.01)

(58) Field of Classification Search
CPC .............. F16C 32/0442; F16C 32/0444; F16C 32/0446; F16C 32/0448; F16C 32/0451; G01M 13/04
See application file for complete search history.

(56) References Cited

U.S. PATENT DOCUMENTS 4,167,296 A * 9/1979 Dendy .................. G05D 3/1445 310/90.5
5,347,190 A * 9/1994 Lewis .................. F16C 32/0455 310/68 B (Continued)

FOREIGN PATENT DOCUMENTS

CN 103196672 A 7/2013
CN 106441894 A 2/2017

(Continued)

OTHER PUBLICATIONS

Neisi, Neda, et al. "Performance evaluation of touchdown bearing using model-based approach." Nonlinear Dynamics 101.1 (2020): 211-232.*

Gouws, Jacob Marthinus, and Jan Jacobus Janse van Rensburg. "An Investigation into Backup Bearing Life using Quantified Rotor Delevitation Severity Indicators." Proceedings of ISMB15 (2016).*

(Continued)

*Primary Examiner* — Herbert K Roberts
(74) *Attorney, Agent, or Firm* — NIXON & VANDERHYE

(57) ABSTRACT

A monitoring system for monitoring condition of one or more safety bearings (110) of a magnetically levitated object (107) comprises sensor equipment (101) for producing a sensor signal indicative of movement of the magnetically levitated object, a memory (102), and a data processing system (103) configured to: record, to the memory, waveform samples of the sensor signal in drop situations in which magnetic levitation of the object stops and the object falls from a magnetically levitated position onto the one or more safety bearings, and to form a condition indicator of the safety bearings based on differences between the waveform samples recorded in different ones of the drop situations. Thus, the status of the one or more safety bearings is evaluated based on comparing historical records of drop situations.

17 Claims, 3 Drawing Sheets

(56) References Cited

U.S. PATENT DOCUMENTS

| | | | | |
|---|---|---|---|---|
| 6,404,088 | B1 * | 6/2002 | Barada | F16C 32/0446 310/90.5 |
| 2012/0063918 | A1 * | 3/2012 | de Larminat | F16C 32/0442 417/1 |
| 2015/0260221 | A1 | 9/2015 | Anders et al. | |
| 2016/0146247 | A1 * | 5/2016 | Walter | F16C 32/048 73/862.642 |
| 2019/0339054 | A1 * | 11/2019 | Sarwar | G01B 7/14 |

FOREIGN PATENT DOCUMENTS

| | | | | |
|---|---|---|---|---|
| CN | 106441894 B | * 10/2018 | G06F 17/18 |
| CN | 112460146 A | 3/2021 | |
| EP | 3562001 A1 | 10/2019 | |
| EP | 3702633 A1 | 9/2020 | |

OTHER PUBLICATIONS

Van Rensburg, Jan Jacobus Janse. Delevitation modelling of an active magnetic bearing supported rotor. Diss. 2014.*

Schüßler, Benedikt, Timo Hopf, and Stephan Rinderknecht. "Simulative investigation of rubber damper elements for planetary touch-down bearings." Bulletin of the Polish Academy of Sciences. Technical Sciences 69.6 (2021).*

Chandra, N. Harish, and A. S. Sekhar. "Fault detection in rotor bearing systems using time frequency techniques." Mechanical Systems and Signal Processing 72 (2016): 105-133.*

International Search Report for PCT/FI2023/050127 dated May 15, 2023, 4 pages.

Written Opinion of the ISA for PCT/FI2023/050127 dated May 15, 2023, 7 pages.

Search Report for FI Application No. 20225264 dated Nov. 25, 2022, 2 pages.

* cited by examiner

MONITORING SYSTEM AND A METHOD FOR MONITORING CONDITION OF SAFETY BEARINGS OF A MAGNETICALLY LEVITATED OBJECT

CROSS-REFERENCE TO RELATED APPLICATIONS

This application is the U.S. national phase of International Application No. PCT/FI2023/050127 filed Mar. 7, 2023 which designated the U.S. and claims priority to FI 20225264 filed Mar. 28, 2022, the entire contents of each of which are hereby incorporated by reference.

FIELD OF THE DISCLOSURE

The disclosure relates generally to safety bearings of a magnetically levitated object that can be for example a rotor of an electrical machine. More particularly, the disclosure relates to a monitoring system, a method, and a computer program for monitoring condition of one or more safety bearings of a magnetically levitated object. Furthermore, the disclosure relates to a magnetic bearing system.

BACKGROUND

Magnetic bearing systems are commonly used for levitating rotating objects. A typical application is levitation of a rotor of an electrical machine, e.g. a high-speed electrical machine. In many cases, the levitation is accomplished by balancing attractive forces of oppositely acting magnets and other forces acting on an object to be levitated, where at least one of the magnets is a controllable electromagnet. In principle, it is also possible to balance an attractive force of one controllable electromagnet with other forces, e.g. the gravity force, acting against the attractive force of the electromagnet. There are several different kinds of magnetic bearing systems. Some systems use permanent magnet material to generate bias magnetic fluxes, while others use direct biasing currents to generate the bias magnetic fluxes. The biasing is used to linearize the operation of the system and to improve control dynamics of the system. Furthermore, the biasing based on permanent magnet material reduces energy consumption of a magnetic bearing system.

Magnetic forces acting in all or some degrees of freedom of a levitated object, e.g. a rotor of an electrical machine, need to be controlled actively because of inherent instability of the magnetic levitation. The instability is caused by the fact that a magnetic attractive force acting between a magnet and an object made of e.g. ferromagnetic material increases when an airgap between the magnet and the object gets smaller.

In case of a control failure and/or absence of energy and/or excessive external disturbance, an object levitated by a magnetic bearing system is shifted from a desired position of the object. To prevent damages of the object and/or stationary parts of the magnetic bearing system, the magnetic bearing system is typically equipped with safety bearings for carrying the object when the magnetic levitation is non-operating or when the capacity of the magnetic levitation is exceeded. At standstill, the safety bearings are utilized to rest the object after a system shut down.

The safety bearings are designed to withstand a limited number of full speed drop situations where the magnetic levitation of a rotating object stops unintentionally and consequently the rotating object falls from a magnetically levitated position onto the safety bearings. The safety bearings also can withstand a greater number of minor touches during operation. However, it is challenging to estimate what is the status of the safety bearings after the object has contacted with different severity. This may lead to early replacement of the safety bearings when their lifetime is still not fully utilized.

Publication US20160146247 describes a method for monitoring a status of safety bearings of a rotor of a machine. The method comprises catching the rotor with the safety bearings when magnetic bearings of the machine fail, switching the magnetic bearings off for monitoring the status of the safety bearings, rotating the rotor according to a pre-defined motion sequence, measuring a physical variable relating to the safety bearings with a sensor, comparing the measured physical variable or a variable derived from the measured physical variable with a target value, and generating a warning message if a deviation of the physical variable or the derived variable from the target value exceeds a threshold value. A possible inconvenience related to the method of US20160146247 is the need for the pre-defined motion sequence that should be defined so that the physical variable measured during the motion sequence is sufficiently indicative of the status of the safety bearings.

SUMMARY

The following presents a simplified summary to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new monitoring system for monitoring condition of one or more safety bearings of a magnetically levitated object that can be for example a rotor of an electrical machine.

A monitoring system according to the invention comprises sensor equipment configured to produce a sensor signal indicative of movement of the magnetically levitated object, a memory, and a data processing system configured to:

- record, to the memory, waveform samples of the sensor signal in response to drop situations in which magnetic levitation of the object stops and consequently the object falls from a magnetically levitated position onto the one or more safety bearings, and
- form a condition indicator of the safety bearings based on differences between the waveform samples recorded in response to different ones of the drop situations.

The waveform sample of the sensor signal can be recorded after each drop situation in which the object is drop down from the magnetically levitated position onto the one or more safety bearings. Each drop down provides an excitation close to an impulse with a broad-spectrum range and thus a condition or at least a change in the condition of the one or more safety bearings can be indicated by differences between the waveform samples recorded after the drop downs. A drop down is naturally happening every time when the magnetically levitated object is put on rest during a shutdown. Thus, the recordings can be carried out without any additional effort such as e.g. pre-defined motion sequences or the like.

In accordance with the invention, there is also provided a new magnetic bearing system that comprises:

- at least one magnetic bearing configured to magnetically levitate an object,
- a sensor system configured to generate a position signal indicative of a position of the object with respect to a reference position of the object,
- a controller configured to control electric current of each coil of the at least one magnetic bearing based on the position signal,
- one or more safety bearings configured to support the object in response to drop situations in which magnetic levitation of the object stops and consequently the object falls from a magnetically levitated position onto the one or more safety bearings, and
- a monitoring system according to the invention for monitoring condition of the one or more safety bearings.

In accordance with the invention, there is also provided a new method for monitoring condition of one or more safety bearings of a magnetically levitated object. The method comprises:

- producing a sensor signal indicative of movement of the magnetically levitated object,
- recording, to a memory, waveform samples of the sensor signal in response to drop situations in which magnetic levitation of the object stops and consequently the object falls from a magnetically levitated position onto the one or more safety bearings, and
- forming a condition indicator of the safety bearings based on differences between the waveform samples recorded in response to different ones of the drop situations.

In accordance with the invention, there is also provided a new computer program for monitoring condition of one or more safety bearings of a magnetically levitated object. A computer program according to the invention comprises computer executable instructions for controlling a programmable data processing system to:

- receive a sensor signal indicative of movement of the magnetically levitated object,
- record, to a memory, waveform samples of the sensor signal in response to drop situations in which magnetic levitation of the object stops and consequently the object falls from a magnetically levitated position onto the one or more safety bearings, and
- form a condition indicator of the safety bearings based on differences between the waveform samples recorded in response to different ones of the drop situations.

Exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
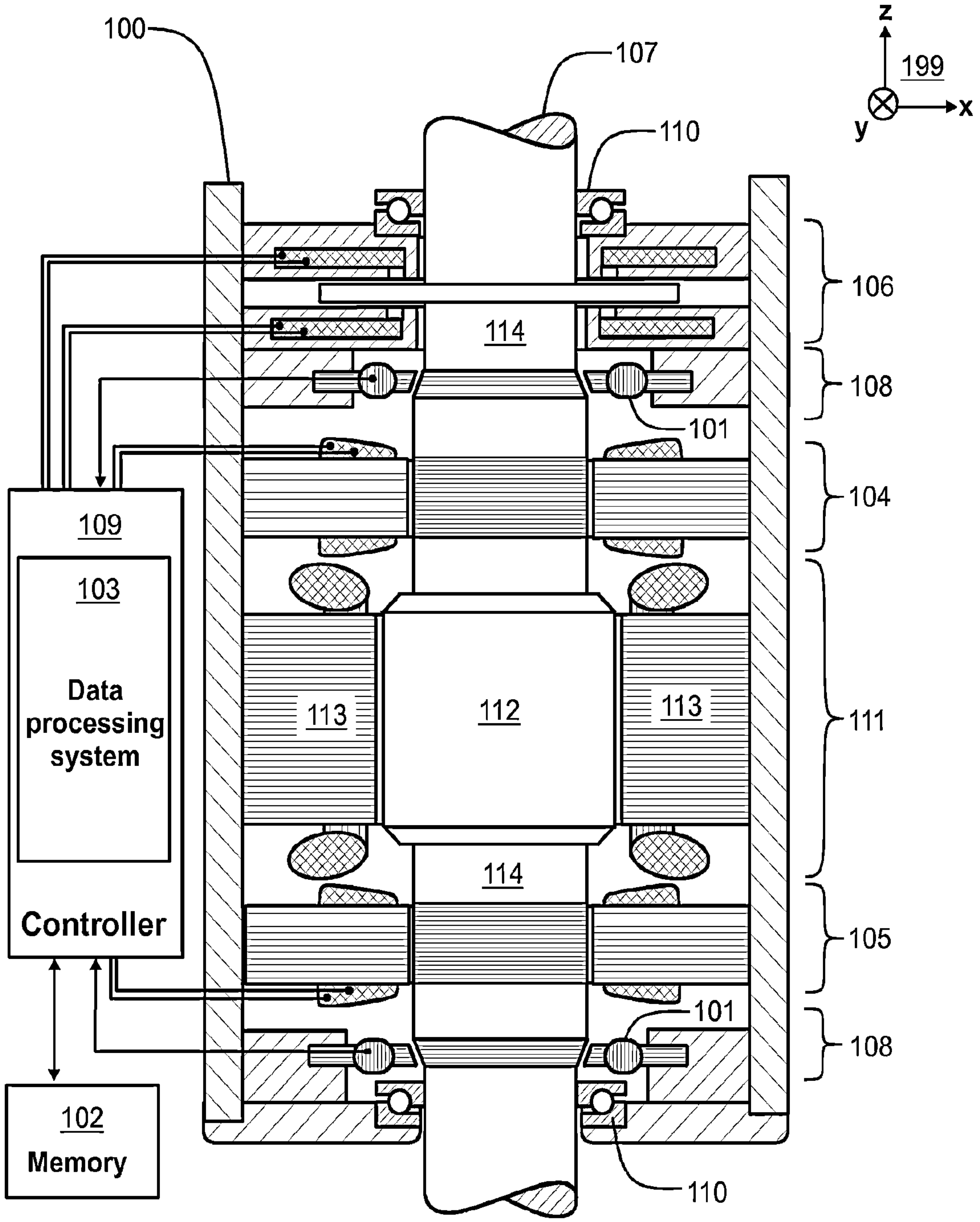
FIG. 1*a* illustrates a magnetic bearing system according to an exemplifying and non-limiting embodiment.

FIG. 1*a* illustrates a magnetic bearing system according to an exemplifying and non-limiting embodiment. The magnetic bearing system comprises radial magnetic bearings 104 and 105 and an axial magnetic bearing 106 which are configured to magnetically levitate an object 107. It is also possible that a magnetic bearing system according to an exemplifying and non-limiting embodiment comprises only one magnetic bearing, e.g. an axial magnetic bearing in a case in which radial bearings are gas bearing.

In the exemplifying case illustrated in FIG. 1*a*, the magnetically levitated object 107 is a rotor of an electrical machine 100 and the magnetic bearing system is a part of the electrical machine 100. The rotor comprises an electromagnetically active part 112 and a shaft 114. The electrical machine further comprises a stator 111 that comprises a stator core 113 and stator windings. The electrical machine 100 can be for example an induction machine, a permanent magnet "PM" machine, an electrically excited synchronous machine, or a synchronous reluctance machine. In FIG. 1*a*, stationary parts of the electrical machine 100 are shown as a section view so that a geometric section plane is parallel with the xz-plane of a coordinate system 199.

The magnetic bearing system comprises a sensor system 108 configured to generate a position signal indicative of a position of the object 107 with respect to a reference position of the object. In this exemplifying case, the position signal has the following five signal components: first and second signal components indicative of x- and y-positions of the upper end of the object 107, third and fourth signal components indicative of x- and y-positions of the lower end of the object 107, and a fifth signal component indicative of a z-position i.e. an axial position of the object 107. The magnetic bearing system comprises a controller 109 that is configured to control electric current of each coil of the magnetic bearings 104-106 based on the position signal. The magnetic bearing system further comprises safety bearings 110 configured to support the object 107 in response to drop situations in which magnetic levitation of the object 107 stops and consequently the object falls from a magnetically levitated position onto the safety bearings 110.

The magnetic bearing system comprises a monitoring system according to an exemplifying and non-limiting embodiment for monitoring condition of the safety bearings 110. The monitoring system comprises sensor equipment 101 configured to produce a sensor signal indicative of movement of the magnetically levitated object 107. In this exemplifying case, the sensor system 108 of the magnetic bearing system is configured to also act as the sensor equipment 101 of the monitoring system. It is also possible that the monitoring system comprises its own sensor equipment that can be for example a position sensor, e.g. an inductive position sensor, an accelerometer, a flux sensor, an acoustic sensor, or some other sensor equipment which produces a sensor signal which is directly or indirectly indicative of movement of the magnetically levitated object 107 when it hits to the safety bearings in a dropping situation.

The monitoring system comprises a memory 102 and a data processing system 103 that is configured to record to the memory 102 waveform samples of the sensor signal in response to drop situations in which the magnetic levitation of the object stops and consequently the object falls from the magnetically levitated position onto the safety bearings 110. Furthermore, the data processing system 103 is configured to form a condition indicator of the safety bearings 110 based on differences between the waveform samples recorded in response to different ones of the drop situations. Therefore, the condition of the safety bearings 110 is analyzed based on comparing the waveform samples recorded at different times. One part of the analysis can be done in the time domain to find possible anomalies between the recorded waveform samples and based on those the condition of the safety bearings 110 can be evaluated. A second part of the analysis can be done in the frequency domain where the recorded waveform samples are processed by the Fourier transform, such as the fast Fourier transform "FFT", to get their frequency spectra.

In the exemplifying monitoring system illustrated in FIG. 1*a*, the controller 109 of the magnetic bearing system is configured to also act as the data processing system 103 of the monitoring system. To have a good resolution of the recorded waveform samples, the recordings are advantageously made directly from one or more analog-to-digital converters "ADC" of the sensor system 108 with a maximum sampling rate, omitting any possible software filtering. The ADCs are not shown in FIG. 1*a*. The recording with the maximum sampling rate is facilitated by that a temporal duration of each waveform sample can be short. Furthermore, the short temporal durations of the waveform samples reduce memory needs. After a drop down, there is no need to ensure the stability of the magnetic bearing system, and thus services other than recoding data to the memory 102 can be removed from the workload of the controller 109. The data can be routed directly from an ADC to a dedicated memory area through a direct memory access "DMA". Therefore, in a magnetic bearing system according to an exemplifying and non-limiting embodiment, the controller 109 is configured to deactivate the control of the magnetic bearings 104-106 in response to each drop situation to release capacity of the controller 109 to act as the data processing system of the monitoring system.

Figure 1B:
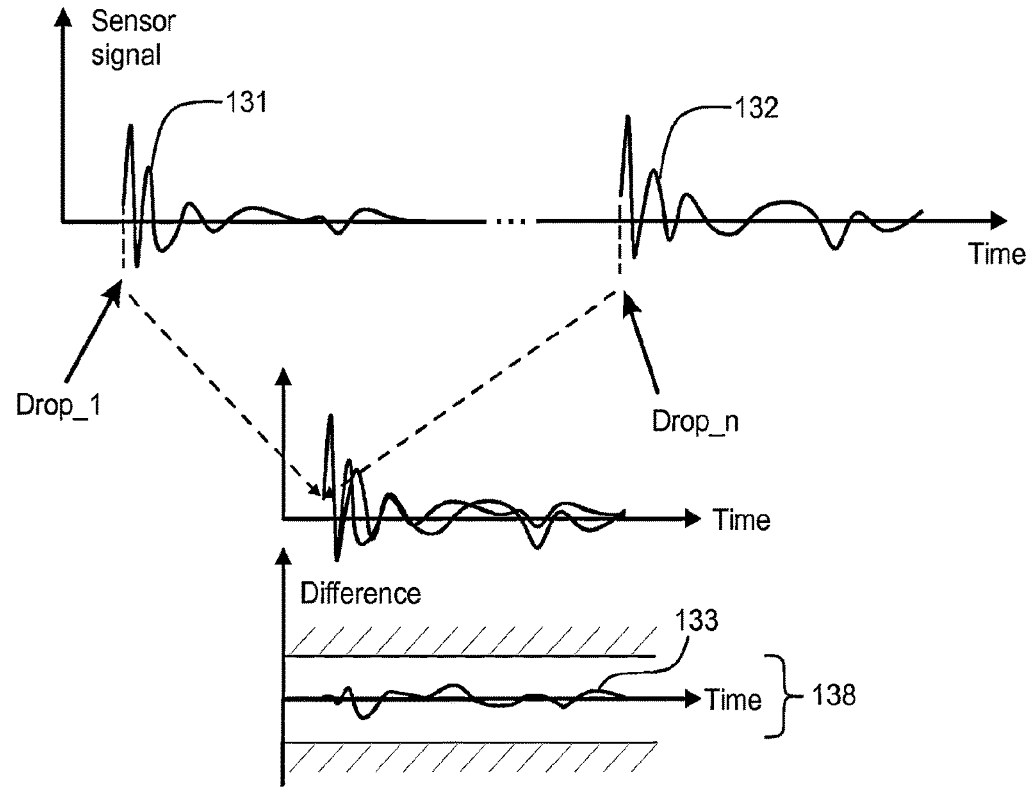
FIGS. 1*b* and 1*c* illustrate exemplifying operation of a monitoring system according to an exemplifying and non-limiting embodiment for monitoring condition of one or more safety bearings of a magnetically levitated object.

FIG. 1*b* illustrates an exemplifying time domain analysis of first and second waveform samples 131 and 132 which have been recorded after drop situations Drop_1 and Drop_n. The waveform samples 131 and 132 may represent for example the x-position of the upper end of the object 107 or some other signal component indicative of the position of the object 107 in one degree of freedom. In this exemplifying case, the data processing system 103 is configured to compute a difference waveform 133 that is a difference between the first and second waveform samples so that starting points of the first and second waveform samples are aligned to each other. The data processing system 103 is configured to form the condition indicator of the safety bearings 110 based on the computed difference waveform. For example, the data processing system 103 can be configured to set the condition indicator to express a worn state of the safety bearings 110, i.e. the lifetime of the safety bearings 110 has ended, in response to a situation in which the computed difference waveform 133 is outside a predetermined tolerance area 138. In the exemplifying situation shown in FIG. 1*b*, the difference waveform 133 is within the tolerance area 138 and thus the safety bearings 110 have still lifetime.

In a monitoring system according to an exemplifying and non-limiting embodiment, the data processing system 103 is configured to compute a time domain trend variable that is indicative of increase of power of the difference waveform when i) a new drop situation takes place, ii) the first waveform sample 131 is kept unchanged in the computation of the difference waveform, and iii) the second waveform sample 132 is changed to be a new waveform sample recorded after the new drop situation. The time domain trend variable indicates how the difference between the most recent waveform sample and the first waveform sample 131 develops over time. Therefore, the time domain trend variable is indicative of development of a status of the safety bearings 110 over time.

Figure 1C:
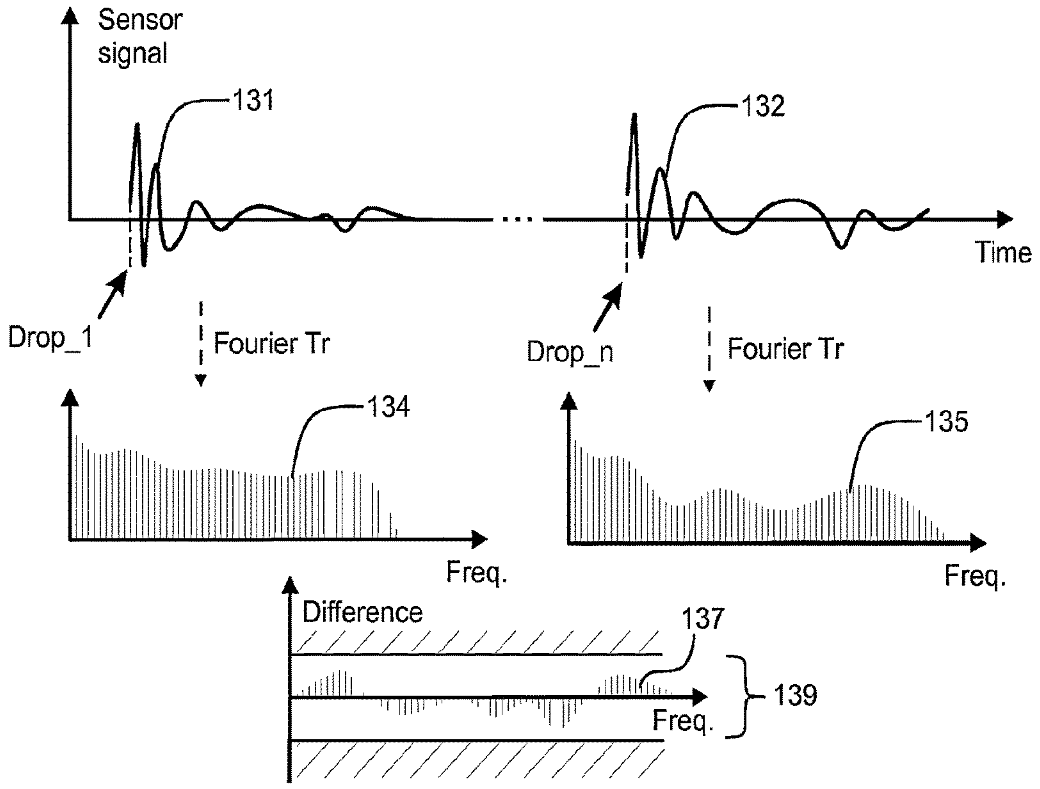

FIG. 1*c* illustrates an exemplifying frequency domain analysis of the above-mentioned first and second waveform samples 131 and 132. In this exemplifying case, the data processing system 103 is configured to compute frequency spectra 134 and 135 of first and second waveform samples 131 and 132 and compute a difference spectrum 137 that is a difference between the computed frequency spectra. The data processing system 103 is configured to form the condition indicator of the safety bearings 110 based on the computed difference spectrum 137. For example, the data processing system 103 can be configured to set the condition indicator to express a worn state of the safety bearings 110, i.e. the lifetime of the safety bearings 110 has ended, in response to a situation in which the computed difference spectrum 137 is outside a predetermined tolerance area 139. In the exemplifying situation shown in FIG. 1*c*, the difference spectrum 137 is within the tolerance area 139 and thus the safety bearings 110 have still lifetime.

In a monitoring system according to an exemplifying and non-limiting embodiment, the data processing system 103 is configured to compute a frequency domain trend variable that is indicative of increase of power of the difference spectrum when i) a new drop situation takes place, ii) the first waveform sample 131 is kept unchanged in the computation of the difference spectrum, and iii) the second waveform sample 132 is changed to be a new waveform sample recorded after the new drop situation. The frequency domain trend variable indicates how the difference between the spectrum of the most recent waveform sample and the spectrum of the first waveform sample 131 develops over time. Therefore, the frequency domain trend variable is indicative of development of the status of the safety bearings over time.

The controller 109 shown in FIG. 1*a* can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the controller 109 may comprise one or more memory devices such as e.g. random-access memory "RAM" devices. The memory 102 shown in FIG. 1*a* can be implemented with one or more memory devices such as e.g. RAM devices.

Figure 2:
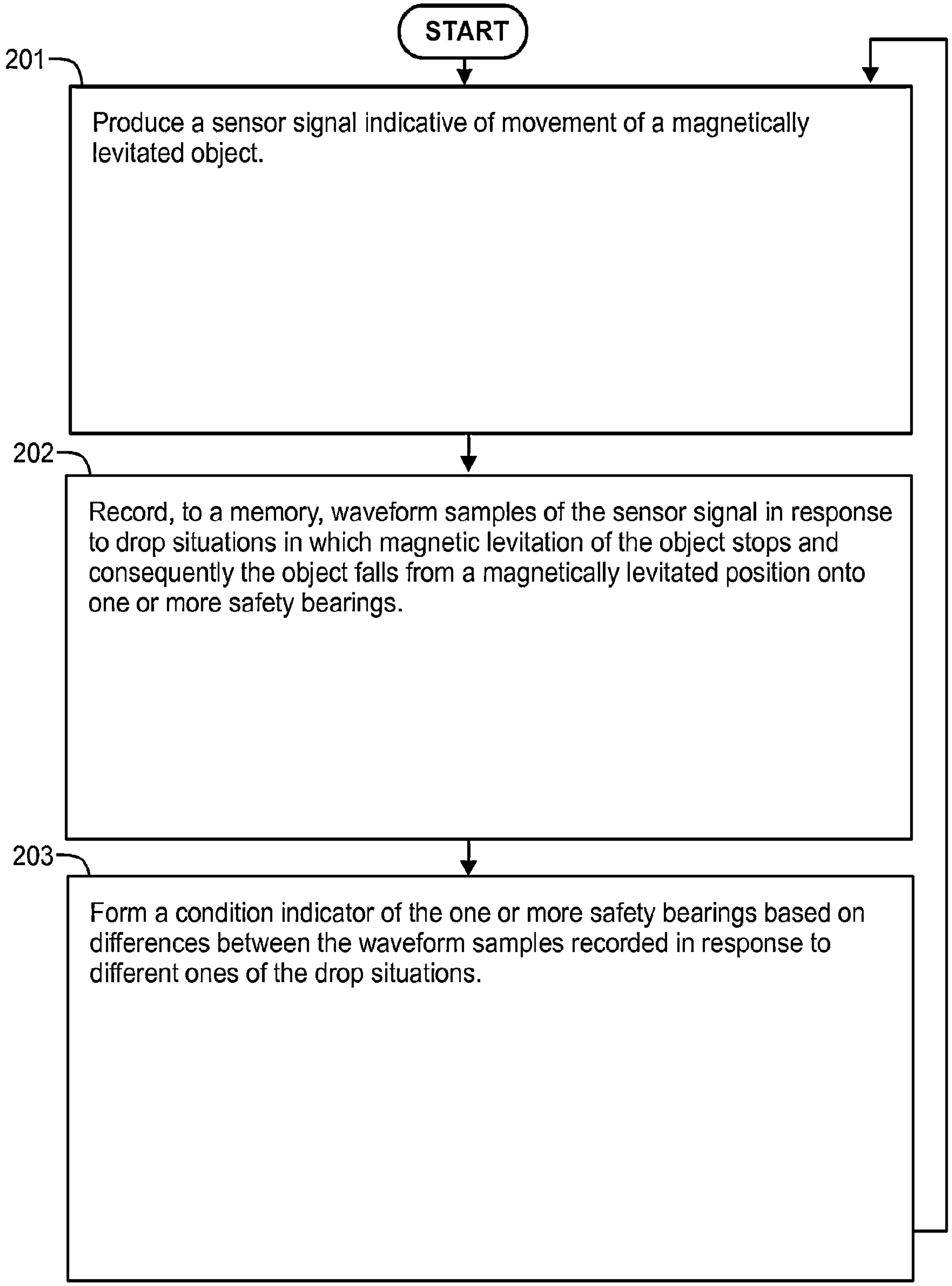
FIG. 2 shows a flowchart of a method according to an exemplifying and non-limiting embodiment for monitoring condition of one or more safety bearings of a magnetically levitated object.

FIG. 2 shows a flowchart of a method according to an exemplifying and non-limiting embodiment for monitoring condition of one or more safety bearings of a magnetically levitated object. The method comprises the following actions:

- action 201: producing a sensor signal indicative of movement of the magnetically levitated object,
- action 202: recording, to a memory, waveform samples of the sensor signal in response to drop situations in which magnetic levitation of the object stops and consequently the object falls from a magnetically levitated position onto the one or more safety bearings, and
- action 203: forming a condition indicator of the one or more safety bearings based on differences between the waveform samples recorded in response to different ones of the drop situations.

A method according to an exemplifying and non-limiting embodiment comprises:

- computing a difference waveform being a difference between first and second ones of the waveform samples relating to different ones of the drop situations so that starting points of the first and second waveform samples are aligned to each other, and
- forming the condition indicator of the one or more safety bearings based on the computed difference waveform.

A method according to an exemplifying and non-limiting embodiment comprises setting the condition indicator to express a worn state of the one or more safety bearings in response to a situation in which the computed difference waveform is outside a predetermined tolerance area.

A method according to an exemplifying and non-limiting embodiment comprises computing a time domain trend variable indicative of increase of power of the difference waveform when i) a new drop situation takes place, ii) the first one of the waveform samples is kept unchanged in the computation of the difference waveform, and iii) the second one of the waveform samples is changed to be a new waveform sample relating to the new drop situation. The time domain trend variable is indicative of development of the status of the one or more safety bearings over time.

A method according to an exemplifying and non-limiting embodiment comprises:

- compute frequency spectra of first and second ones of the waveform samples relating to different ones of the drop situations,
- computing a difference spectrum being a difference between the computed frequency spectra, and
- forming the condition indicator of the one or more safety bearings based on the difference spectrum.

A method according to an exemplifying and non-limiting embodiment comprises setting the condition indicator to express a worn state of the one or more safety bearings in response to a situation in which the difference spectrum is outside a predetermined tolerance area.

A method according to an exemplifying and non-limiting embodiment comprises computing a frequency domain trend variable indicative of increase of power of the difference spectrum when i) a new drop situation takes place, ii) the first one of the waveform samples is kept unchanged in the computation of the difference spectrum, and iii) the second one of the waveform samples is changed to be a new waveform sample relating to the new drop situation. The frequency domain trend variable is indicative of development of the status of the one or more safety bearings over time.

A computer program according to an exemplifying and non-limiting embodiment comprises computer executable instructions for controlling a programmable data processing system to carry out actions related to a method according to any of the above-described exemplifying and non-limiting embodiments.

A computer program according to an exemplifying and non-limiting embodiment comprises software modules for monitoring condition of one or more safety bearings of a magnetically levitated object. The software modules comprise computer executable instructions for controlling a programmable data processing system to:

- receive a sensor signal indicative of movement of the magnetically levitated object,
- record, to a memory, waveform samples of the sensor signal in response to drop situations in which magnetic levitation of the object stops and consequently the object falls from a magnetically levitated position onto the one or more safety bearings, and
- form a condition indicator of the one or more safety bearings based on differences between the waveform samples recorded in response to different ones of the drop situations.

The software modules can be for example subroutines or functions implemented with programming tools suitable for the programmable data processing system.

A computer program product according to an exemplifying and non-limiting embodiment comprises a computer readable medium, e.g. a compact disc "CD", encoded with a computer program according to an exemplifying embodiment of invention.

A signal according to an exemplifying and non-limiting embodiment is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A monitoring system for monitoring condition of one or more safety bearings of a magnetically levitated object, the monitoring system comprising sensor equipment configured to produce a sensor signal indicative of movement of the magnetically levitated object, wherein the monitoring system comprises a memory and a data processing system configured to:

- record, to the memory, waveform samples of the sensor signal in response to drop situations in which magnetic levitation of the object stops and consequently the object falls from a magnetically levitated position onto the one or more safety bearings, the drop situations providing excitation for movement of the object supported by the one or more safety bearings after the drop situations, and the waveform samples being indicative of the movement excited by the drop situations, and form a condition indicator of the one or more safety bearings based on differences between the waveform samples recorded in response to different ones of the drop situations.

2. A monitoring system according to claim 1, wherein the data processing system is configured to:

compute a difference waveform being a difference between first and second ones of the waveform samples relating to different ones of the drop situations so that starting points of the first and second waveform samples are aligned to each other, and form the condition indicator of the one or more safety bearings based on the computed difference waveform.

3. A monitoring system according to claim 2, wherein the data processing system is configured to set the condition indicator to express a worn state of the one or more safety bearings in response to a situation in which the computed difference waveform is outside a predetermined tolerance area.

4. A monitoring system according to claim 2, wherein the data processing system is configured to compute a time domain trend variable indicative of increase of power of the difference waveform when i) a new drop situation takes place, ii) the first one of the waveform samples is kept unchanged in computation of the difference waveform, and iii) the second one of the waveform samples is changed to be the waveform sample relating to the new drop situation, the time domain trend variable being indicative of development of a status of the one or more safety bearings over time.

5. A monitoring system according to claim 1, wherein the data processing system is configured to:

compute frequency spectra of first and second ones of the waveform samples relating to different ones of the drop situations, compute a difference spectrum being a difference between the computed frequency spectra, and form the condition indicator of the one or more safety bearings based on the difference spectrum.

6. A monitoring system according to claim 5, wherein the data processing system is configured to set the condition indicator to express a worn state of the one or more safety bearings in response to a situation in which the difference spectrum is outside a predetermined tolerance area.

7. A monitoring system according to claim 5, wherein the data processing system is configured to compute a frequency domain trend variable indicative of increase of power of the difference spectrum when i) a new drop situation takes place, ii) the first one of the waveform samples is kept unchanged in computation of the difference spectrum, and iii) the second one of the waveform samples is changed to be the waveform sample relating to the new drop situation, the frequency domain trend variable being indicative of development of a status of the one or more safety bearings over time.

8. A monitoring system according to claim 3, wherein the data processing system is configured to compute a time domain trend variable indicative of increase of power of the difference waveform when i) a new drop situation takes place, ii) the first one of the waveform samples is kept unchanged in computation of the difference waveform, and iii) the second one of the waveform samples is changed to be the waveform sample relating to the new drop situation, the time domain trend variable being indicative of development of a status of the one or more safety bearings over time.

9. A monitoring system according to claim 6, wherein the data processing system is configured to compute a frequency domain trend variable indicative of increase of power of the difference spectrum when i) a new drop situation takes place, ii) the first one of the waveform samples is kept unchanged in computation of the difference spectrum, and iii) the second one of the waveform samples is changed to be the waveform sample relating to the new drop situation, the frequency domain trend variable being indicative of development of a status of the one or more safety bearings over time.

10. A magnetic bearing system comprising:

at least one magnetic bearing configured to magnetically levitate an object, a sensor system configured to generate a position signal indicative of a position of the object with respect to a reference position of the object, a controller configured to control electric current of each coil of the at least one magnetic bearing based on the position signal, and one or more safety bearings configured to support the object in response to drop situations in which magnetic levitation of the object stops and consequently the object falls from a magnetically levitated position onto the one or more safety bearings, wherein the magnetic bearing system comprises a monitoring system for monitoring condition of the one or more safety bearings, the monitoring system comprising sensor equipment configured to produce a sensor signal indicative of movement of the object, a memory, and a data processing system configured to:

record, to the memory, waveform samples of the sensor signal in response to the drop situations providing excitation for movement of the object supported by the one or more safety bearings after the drop situations, the waveform samples being indicative of the movement excited by the drop situations, and form a condition indicator of the one or more safety bearings based on differences between the waveform samples recorded in response to different ones of the drop situations.

11. A magnetic bearing system according to claim 10, wherein the sensor system is configured to act as the sensor equipment of the monitoring system, and the position signal comprises the sensor signal used by the monitoring system.

12. A magnetic bearing system according to claim 10, wherein the controller is configured to act as the data processing system of the monitoring system.

13. A magnetic bearing system according to claim 12, wherein the controller is configured to deactivate the control of the electric current of each coil of the at least one magnetic bearing in response to each of the drop situations to release capacity of the controller to act as the data processing system of the monitoring system.

14. A magnetic bearing system according to claim 11, wherein the controller is configured to act as the data processing system of the monitoring system.

15. A magnetic bearing system according to claim 14, wherein the controller is configured to deactivate the control of the electric current of each coil of the at least one magnetic bearing in response to each of the drop situations to release capacity of the controller to act as the data processing system of the monitoring system.

16. A method for monitoring condition of one or more safety bearings of a magnetically levitated object, the method comprising:

producing a sensor signal indicative of movement of the magnetically levitated object, recording, to a memory, waveform samples of the sensor signal in response to drop situations in which magnetic levitation of the object stops and consequently the object falls from a magnetically levitated position onto the one or more safety bearings, the drop situations providing excitation for movement of the object supported by the one or more safety bearings after the drop situations, and the waveform samples being indicative of the movement excited by the drop situations, and forming a condition indicator of the one or more safety bearings based on differences between the waveform samples recorded in response to different ones of the drop situations.

17. A non-volatile computer readable medium encoded with a computer program for monitoring condition of one or more safety bearings of a magnetically levitated object, the computer program comprising computer executable instructions for controlling a programmable data processing system to:

receive a sensor signal indicative of movement of the magnetically levitated object, record, to a memory, waveform samples of the sensor signal in response to drop situations in which magnetic levitation of the object stops and consequently the object falls from a magnetically levitated position onto the one or more safety bearings, the drop situations providing excitation for movement of the object supported by the one or more safety bearings after the drop situations, and the waveform samples being indicative of the movement excited by the drop situations, and form a condition indicator of the one or more safety bearings based on differences between the waveform samples recorded in response to different ones of the drop situations.

* * * * *